United States Patent
Hanson et al.

(10) Patent No.: US 6,882,487 B2
(45) Date of Patent: Apr. 19, 2005

(54) COMPENSATION FOR TIMING VARIATION IN DISC DRIVES EMPLOYING SERVO TRACKING SYSTEMS

(75) Inventors: Reed D. Hanson, Chaska, MN (US); Timothy F. Ellis, Tonka Bay, MN (US); Dustin M. Cvancara, St. Paul, MN (US); Nathaniel B. Wilson, Edmond, OK (US)

(73) Assignee: Seagate Technology LLC, Scotts Valley, CA (US)

(*) Notice: Subject to any disclaimer, the term of this patent is extended or adjusted under 35 U.S.C. 154(b) by 239 days.

(21) Appl. No.: 10/183,680

(22) Filed: Jun. 27, 2002

(65) Prior Publication Data

US 2003/0184906 A1 Oct. 2, 2003

Related U.S. Application Data

(60) Provisional application No. 60/369,084, filed on Apr. 1, 2002.

(51) Int. Cl.$^7$ .................. G11B 27/30; G11B 19/247
(52) U.S. Cl. .............................. 360/51; 360/73.03
(58) Field of Search .................. 360/51, 73.03, 360/75, 77.02, 77.04, 77.08

(56) References Cited

U.S. PATENT DOCUMENTS

| 4,087,842 | A |   | 5/1978 | Manly |
|---|---|---|---|---|
| 5,315,456 | A |   | 5/1994 | Hessing et al. |
| 5,444,583 | A |   | 8/1995 | Ehrlich et al. |
| 5,559,645 | A | * | 9/1996 | Miyazawa et al. ............. 360/51 |
| 5,602,689 | A |   | 2/1997 | Kadlec et al. |
| 5,617,388 | A |   | 4/1997 | Ishioka et al. |
| 5,907,448 | A | * | 5/1999 | Watanabe et al. ............. 360/51 |
| 5,936,790 | A |   | 8/1999 | Ho et al. |
| 6,078,452 | A |   | 6/2000 | Kittilson et al. |
| 6,515,813 | B1 | * | 2/2003 | Kitazaki et al. ............. 360/51 |
| 6,577,463 | B1 | * | 6/2003 | Frees et al. .................. 360/51 |
| 6,710,957 | B1 | * | 3/2004 | Nakasato ..................... 360/51 |

FOREIGN PATENT DOCUMENTS

JP           404085765 A   *   3/1992

* cited by examiner

Primary Examiner—Sinh Tran
Assistant Examiner—James L Habermehl
(74) Attorney, Agent, or Firm—Westerman, Champlin & Kelly

(57) ABSTRACT

An apparatus and method for compensating for variation in sample rate in a disc drive having a rotating disc and a head that is positioned over the rotating disc is provided. The disc includes at least one track that has multiple consecutive sectors. A sample rate value between timing marks of each pair of consecutive sectors of the multiple consecutive sectors is computed to obtain a sequence of sample rate values. A sequence of timing error values is computed as a function of the sequence of sample rate values and a nominal sample rate value. Data related to the sequence of timing error values is utilized to compensate for variation in sample rate values.

19 Claims, 12 Drawing Sheets

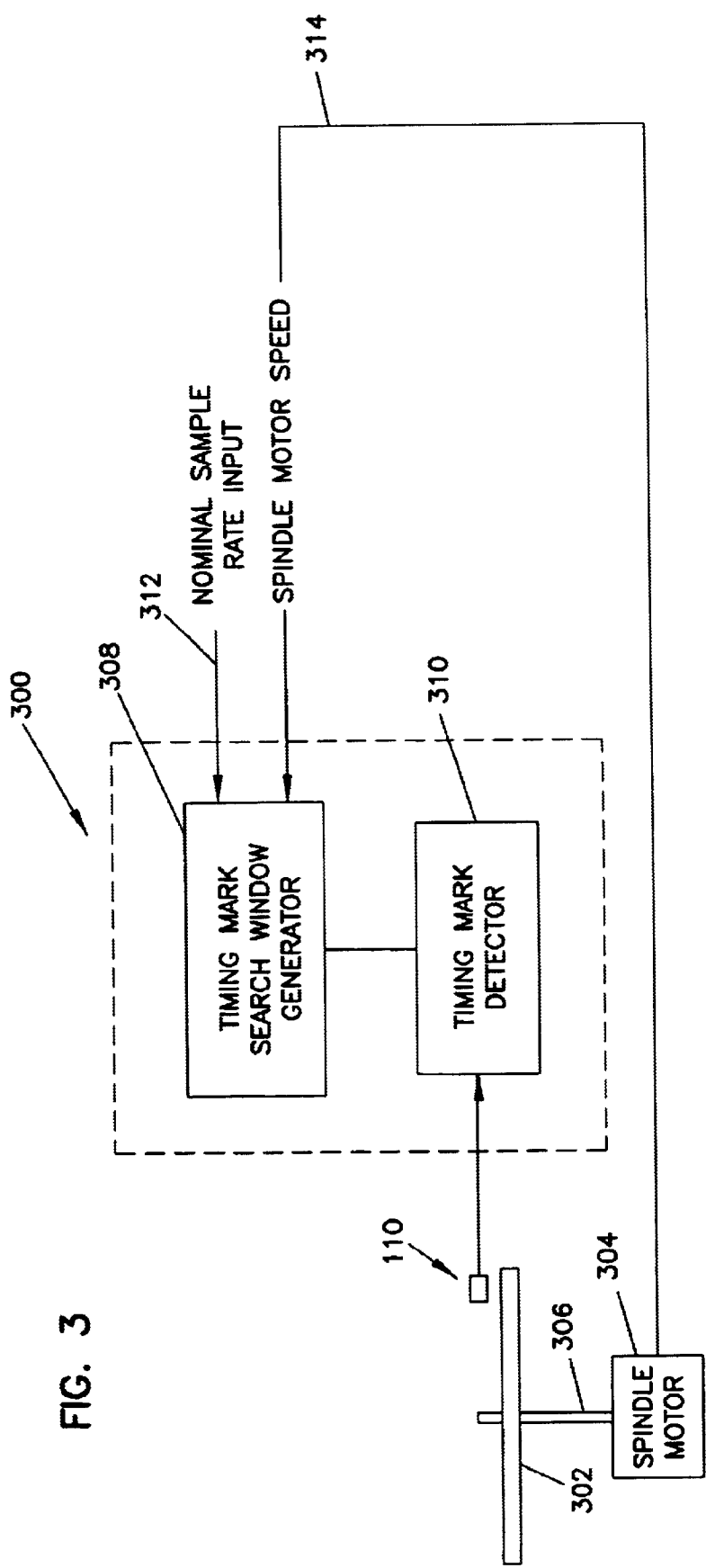

COMPENSATION FOR TIMING VARIATION IN DISC DRIVES EMPLOYING SERVO TRACKING SYSTEMS

CROSS-REFERENCE TO RELATED APPLICATION

This application claims priority from U.S. Provisional Application No. 60/369,084 filed on Apr. 1, 2002 for inventors Reed D. Hanson, Timothy F. Ellis, Dustin M. Cvancara and Nathaniel B. Wilson and entitled "COMPENSATION FOR TIMING VARIATION IN DISK DRIVES HAVING SERVO TRACK ECCENTRICITY."

FIELD OF THE INVENTION

The present invention relates generally to disc drive data storage systems. In particular, the present invention relates to compensation for timing variation in disc drives employing servo tracking systems.

BACKGROUND OF THE INVENTION

Disc drives read and write information along concentric tracks formed on discs. Each of the concentric tracks is divided into a plurality of sectors. Each of these sectors usually includes a servo field and a data field that are contiguous. To locate a particular track on a disc, disc drives typically use the embedded servo fields in the sectors. The embedded servo fields are utilized by a servo sub-system to position a head over a particular track on a rotating disc. The servo field of each sector includes a sector timing mark to verify receipt of the sector and to establish the timing between sequential sectors.

In current disc drives, the servo fields are written onto the disc in-situ (i.e., after the disc is mounted on the spindle motor of a disc drive) when the disc drive is manufactured and are thereafter simply read by the disc drive to determine position during operation. Since each track has a different linear velocity from every other track on the disc, signals written at a constant frequency do not exhibit a constant data density from track to track. For instance, a servo field written at a constant frequency in a sector of an inner track will occupy less linear distance on the inner track than a constant frequency servo field written on a more radially distant outer track. Nevertheless, servo fields are written using constant frequency signals across the tracks. In such a case, radially aligned servo fields occupy different linear distances in their respective tracks, but radially aligned servo fields occupy an identical time window in each track (the angular velocity of each track is identical). Further, in in-situ written tracks, the radial distance between the spin axis of the spindle motor and each sector of a particular track is substantially equal. Thus, the time that elapses between the detection of timing marks of any two adjacent sectors of an in-situ written track, by a head positioned over the track, is substantially constant. This elapsed time between two adjacent sector timing marks is referred to as sample rate, which is substantially constant for a drive employing in-situ written discs. Consequently, a timing mark search window, which is relatively narrow and which is generated at constant intervals of time (equal to the constant sample rate), is used to detect timing marks in drives with such in-situ written discs.

To meet the demand for greater recording density in disc drives, track writing is undergoing a fundamental change. In the near future, manufactured disc drives will include discs with tracks that are pre-written onto the discs before the discs are mounted on the spindle motor of the drive. When such discs with pre-written tracks (pre-written discs) are mounted on a spindle motor of a disc drive, there is a certain amount of misalignment of the track center of the disc and the spin axis of the spindle motor. Because of such disc mounting tolerances, the tracks will be eccentric to the spin axis of the spindle motor. Radial distances between the spin axis of the spindle motor and different sectors on the same track will differ, thereby causing variations in sample rate between timing marks of different adjacent sectors on the same track during disc drive operation. In drives with pre-written discs, if a timing mark search window is generated at a constant or nominal time interval, as in the case of drives including in-situ written discs, the timing window will have to be relatively wide to account for variation in sample rate is these drives with pre-written discs. Widening the timing mark search window is undesirable since it increases the opportunity of false reads of the timing marks. Additionally, in drives that utilize embedded spindle motor control, variations in sample rate complicates the spindle motor control since the spindle motor controller is driven by a timing error that is related to variations in sample rate.

Embodiments of the present invention provide solutions to these and other problems, and offer other advantages over the prior art.

SUMMARY OF THE INVENTION

The present embodiments relate to disc drive servo systems that employ a scheme for compensating for variation in sample rate in a disc drive, thereby addressing the above-mentioned problems.

An apparatus and method for compensating for variation in sample rate in a disc drive having a rotating disc and a head that is positioned over the rotating disc is provided. The disc includes at least one track that has multiple consecutive sectors. A sample rate value between timing marks of each pair of consecutive sectors of the multiple consecutive sectors is computed to obtain a sequence of sample rate values. A sequence of timing error values is computed as a function of the sequence of sample rate values and a nominal sample rate value. Data related to the sequence of timing error values is utilized to compensate for variation in sample rate values.

Other features and benefits that characterize embodiments of the present invention will be apparent upon reading the following detailed description and review of the associated drawings.

BRIEF DESCRIPTION OF THE DRAWINGS

FIG. 3 is a simplified block diagram of a timing control system employed in a disc drive having in-situ written tracks.

FIGS. 5–1 through 5–3 illustrate timing mark and timing mark search window waveforms in drives with in-situ written discs and drives with pre-written discs.

DETAILED DESCRIPTION OF ILLUSTRATIVE EMBODIMENTS

Figure 1:
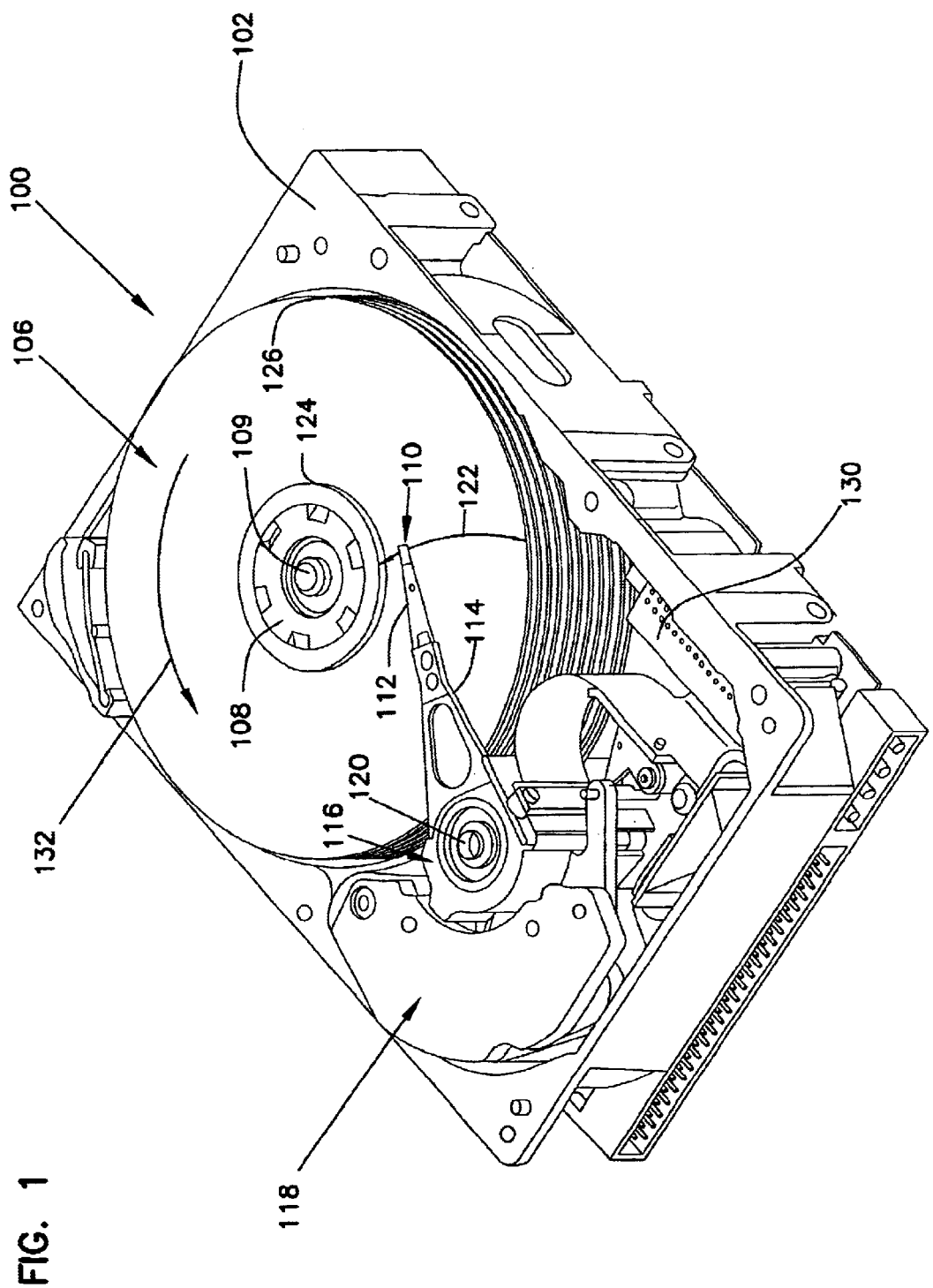
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown in FIG. 1) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
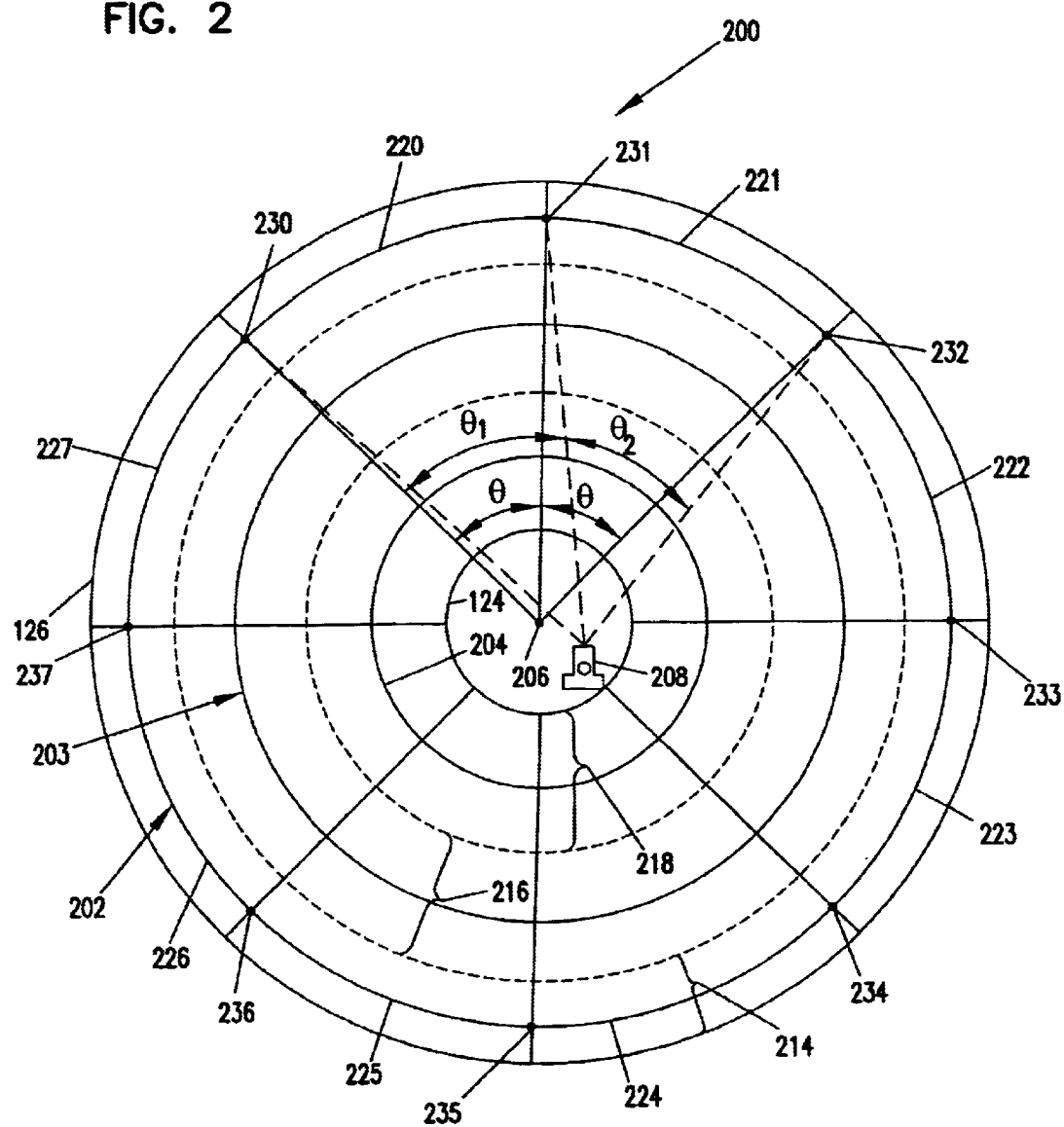
FIG. 2 is a top view of a section of a disc with pre-written tracks.

Referring now to FIG. 2, a top view of a section 200 of a disc, with pre-written tracks such as 202, 203 and 204, which is mounted on a disc drive spindle motor having a spin axis 208 is shown. Disc 200 may be divided into zones, with each zone including multiple tracks. In FIG. 2, three zones 214, 216 and 218 are shown. Disc 200 also includes a plurality of pi-shaped consecutive sectors, numbered 220–227 in FIG. 2, which radially extend across tracks such as 202, 203 and 204. A sector timing mark or pattern, which is utilized to verify receipt of the sector and to establish the timing between sequential sectors, is included at the beginning of each sector of each track. For example, track 202 includes sector timing marks 230–237, with one sector timing mark included in each of sectors 220–227. Pre-written tracks 202, 203 and 204 have an actual track center shown by reference numeral 206. If the track center of the disc coincides with the spin axis of the spindle motor, as in the case of disc drives employing in-situ written discs, the radial distance between the spin axis of the spindle motor and each of timing marks 230–237 is substantially equal. Thus, an angle θ formed between radii connected to a first pair of consecutive or adjacent timing marks such as 230 and 231 is equal to the angle formed between a second pair of consecutive timing marks such as 231 and 232 in drives with in-situ written discs. However, in a drive with a pre-written disc such as 200, an incongruity between the track center 206 and the spindle motor spin axis 208 typically exists. Thus, each of timing marks 230–237 is at a different distance from spin axis 208. Consequently, an angle $θ_1$ formed at spin axis 208 between a first pair of consecutive timing marks such as 230 and 231 is different from an angle $θ_2$ formed at spin axis 208 between a second pair of consecutive timing marks such as 231 and 232. Therefore, the angular distance traveled, and hence the sample rate, is different between different consecutive timing marks in drives with pre-written discs.

Under the present invention, a scheme for compensating for variation in sample rate in a disc drive is employed. Here, compensation for variation in sample rate is carried out by determining sample rate values between timing marks of pairs of consecutive sectors and computing timing error values as a function of the sample rate values and a nominal sample rate value. Data related to the timing error values is stored and subsequently utilized to compensate for variation in sample rate in the disc drive.

Figure 4:
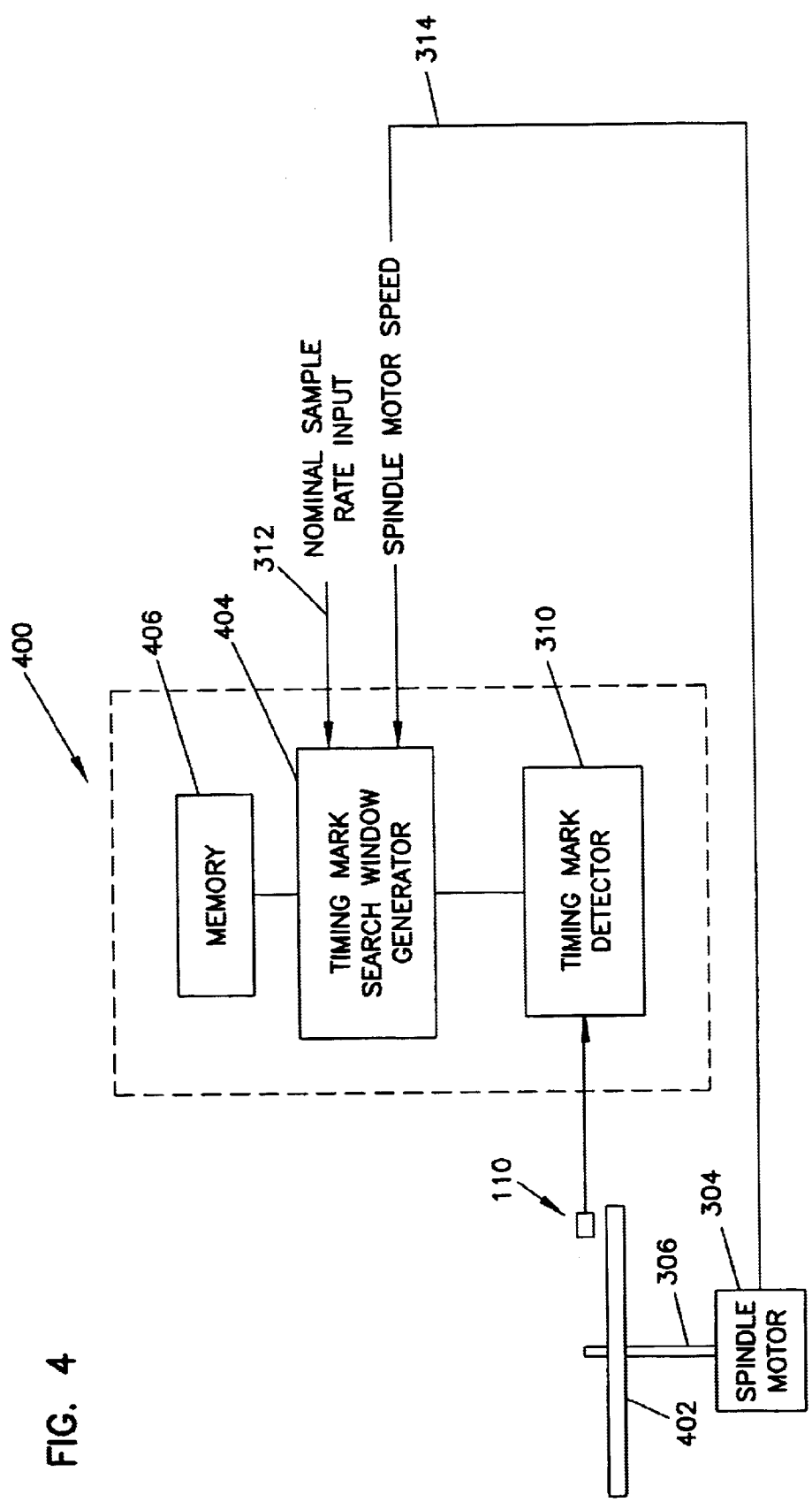
FIG. 4 is a simplified block diagram of a timing control system employed in a disc drive having pre-written tracks.
Figures 1, 5:
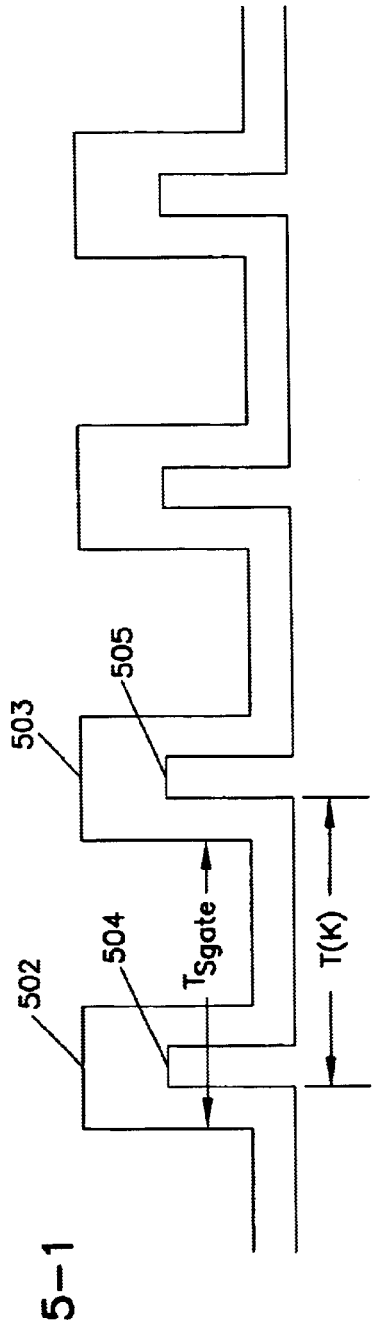
Figures 2, 5:
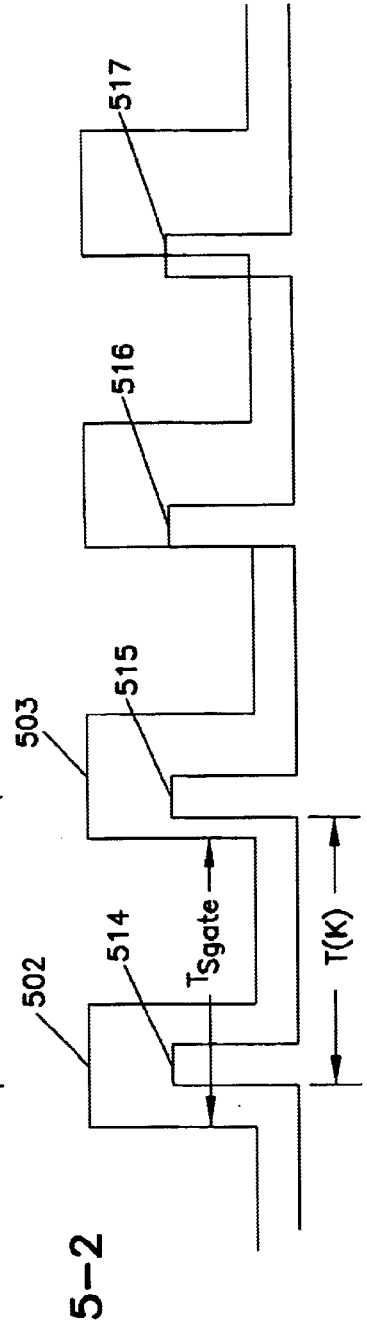
Figures 3, 5:
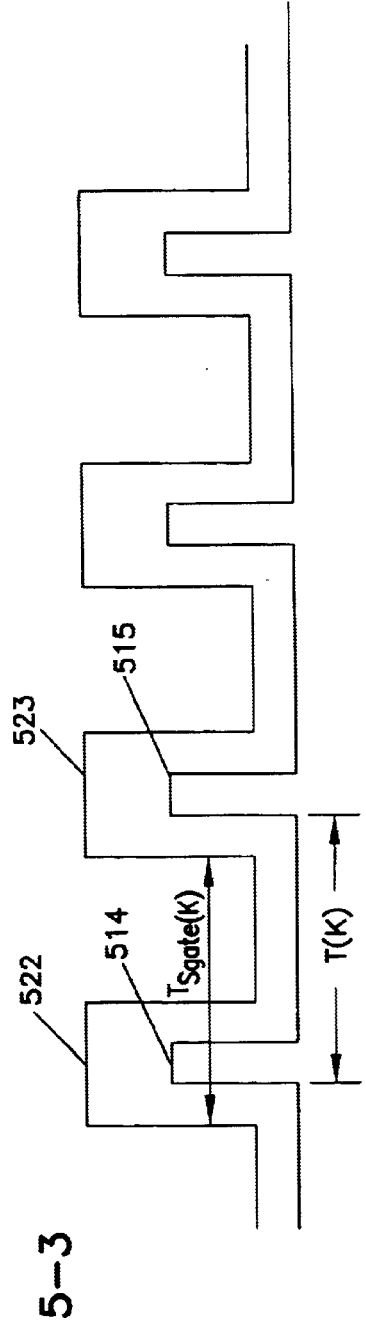

Referring now to FIG. 3, a simplified block diagram of a timing control system 300 employed in a disc drive having in-situ written tracks is shown. Timing control system 300 is electrically coupled to head 110 that is positioned above, and communicates with, the surface of in-situ written disc 302. Energization of spindle motor 304 causes spindle 306 and in-situ written disc 302 to rotate. Timing control system 300 includes a timing mark search window generation circuit 308 and a timing mark detection circuit 310. Based on a nominal or uniform sample rate input 312 and a spindle motor speed input 314, timing mark search window generator 308 generates a waveform such as 502, 503 (see FIG. 5-1) which opens a line to timing mark detector 310 for detector 310 to compare incoming data read by head 110 to a pre-established timing mark stored in timing mark detector 310. As mentioned above, sector timing marks such as 504, 505 (FIG. 5-1) on in-situ written discs (such as 302) are read at the nominal sample rate. Therefore, the search window is also generated at a substantially constant or nominal sample rate by timing mark search window generator 308. Further, a relatively narrow search window can be employed because the timing marks are read at the nominal sample rate. However, if in-situ written disc 302 is replaced by a pre-written disc and timing control system 300 is employed for detecting the timing marks, the search window will have to be widened since the sample rate between timing marks varies for pre-written discs. As mentioned above, widening the timing mark search increases the opportunity of false reads of the timing marks such as 514, 515, 516 and 517 (see FIG. 5-2). If the timing window is not widened, certain timing marks such as 517 (FIG. 5-2) may be bypassed. To avoid these disadvantages in disc drives with pre-written discs, timing control circuit 400, discussed below in connection with FIG. 4, is employed.

Referring now to FIG. 4, a simplified block diagram of a timing control system 400 employed in a disc drive having a pre-written disc, such as 402, is shown. In FIG. 4, the elements common to FIG. 3 are numbered the same. Timing control system 400 includes a timing mark search window generation circuit 404, a memory 406 and timing mark detection circuit 310. Memory 406, which may be non-volatile, includes data related to timing error values which are computed as a function of sample rate values obtained between timing marks of pairs of consecutive sectors of tracks of disc 402 and a nominal sample rate value. The data related to timing error values can be obtained either during factory calibration or start-up calibration of the drive. An example calibration procedure for obtaining the data related to timing error values is described further below. The data in memory 406, which includes track identification number and sector number, is utilized by timing mark search window generator 308 to generate relatively narrow timing windows that are synchronized with variations in sample rate. In FIG. 5-3, timing windows such as 522 and 523 are synchronized with timing marks such as 514 and 515. In some embodiments, the data related to timing error values is determined and stored for a subset of the tracks on the disc (less than all of the tracks on the disc). If this data determined and stored for a subset of tracks and if no timing error value data is available in memory 406 for a particular track over which the head is positioned, then timing error value data associated with a track closest to that track is utilized by timing mark search window generator 404. Each track of the subset of tracks for which timing error value data is determined are preferably spaced evenly apart between the ID and OD of the disc. In some embodiments of the present invention, data related to timing error values is obtained and stored in memory 406 for only one track in each zone. The data for one track within a zone can be utilized for compensation for timing variation in other tracks within the zone since the data related to the timing error values varies coherently across the surface of the disc from the OD to the ID. For example, referring to FIG. 2, data related to timing error values can be obtained only for sectors of track 202 in zone 214, for sectors of track 203 in zone 216 and for sectors of track 204 in zone 218 and utilized to compensate for timing variation in all tracks on disc 200. Timing mark detector 310 and the remaining elements of timing control system 400 are similar to the elements of timing control system 300. An example algorithm employed for compensating for timing variation in a disc drive with pre-written tracks of the present invention is described further below in connection with Equation 2.

Figure 6A:
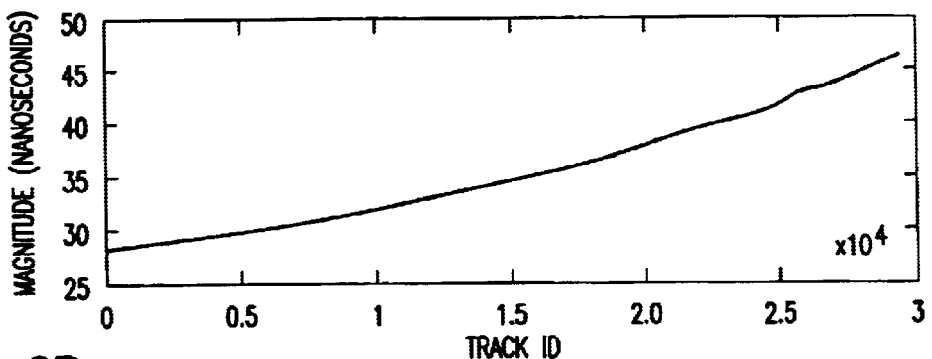
FIG. 6 is a plot of the theoretical variation in sample rate for a drive with pre-written discs.
Figure 6B:
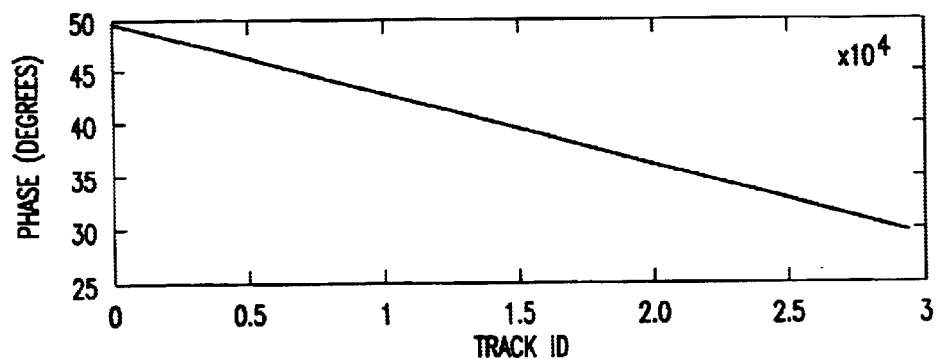
Figure 7A:
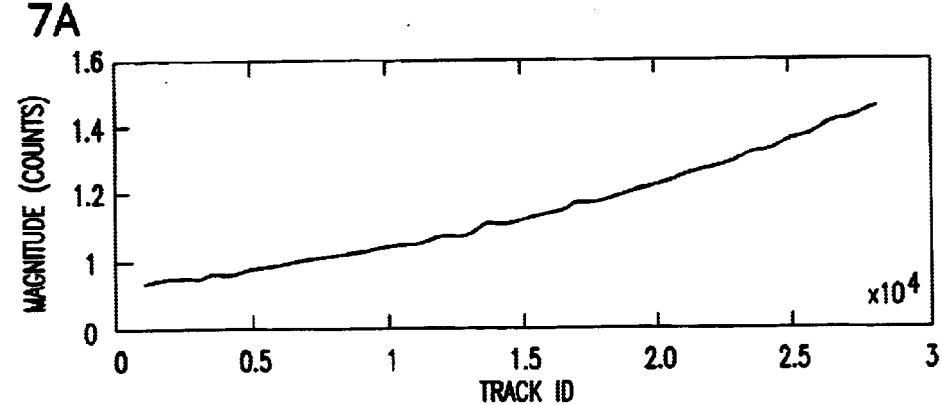
FIG. 7 is a plot showing the variation in sample rate measured in a disc drive with pre-written discs.
Figure 7B:
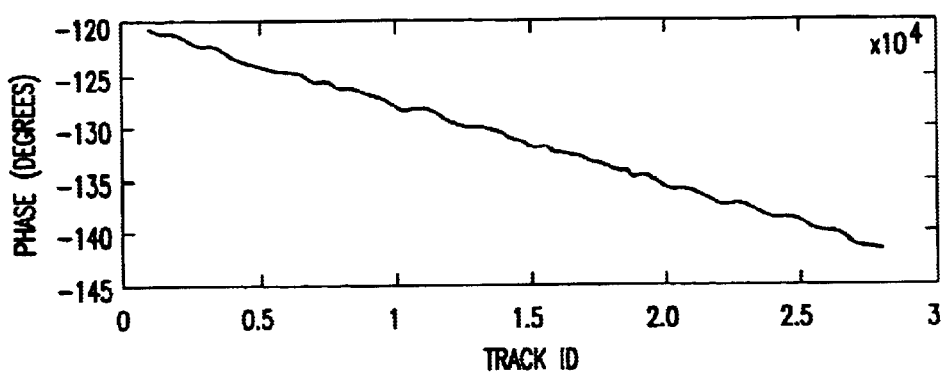

It can be shown, using a kinematic model for a disc drive having track eccentricity, that the variation in the sample rate is essentially sinusoidal. Additionally, it can be shown that the magnitude and phase of the timing variation are radially-dependent as shown in FIG. 6. The theoretical prediction of the kinematic model (FIG. 6) agrees substantially with the timing variation measured in drives that have eccentric tracks as shown in FIG. 7.

Figure 8:
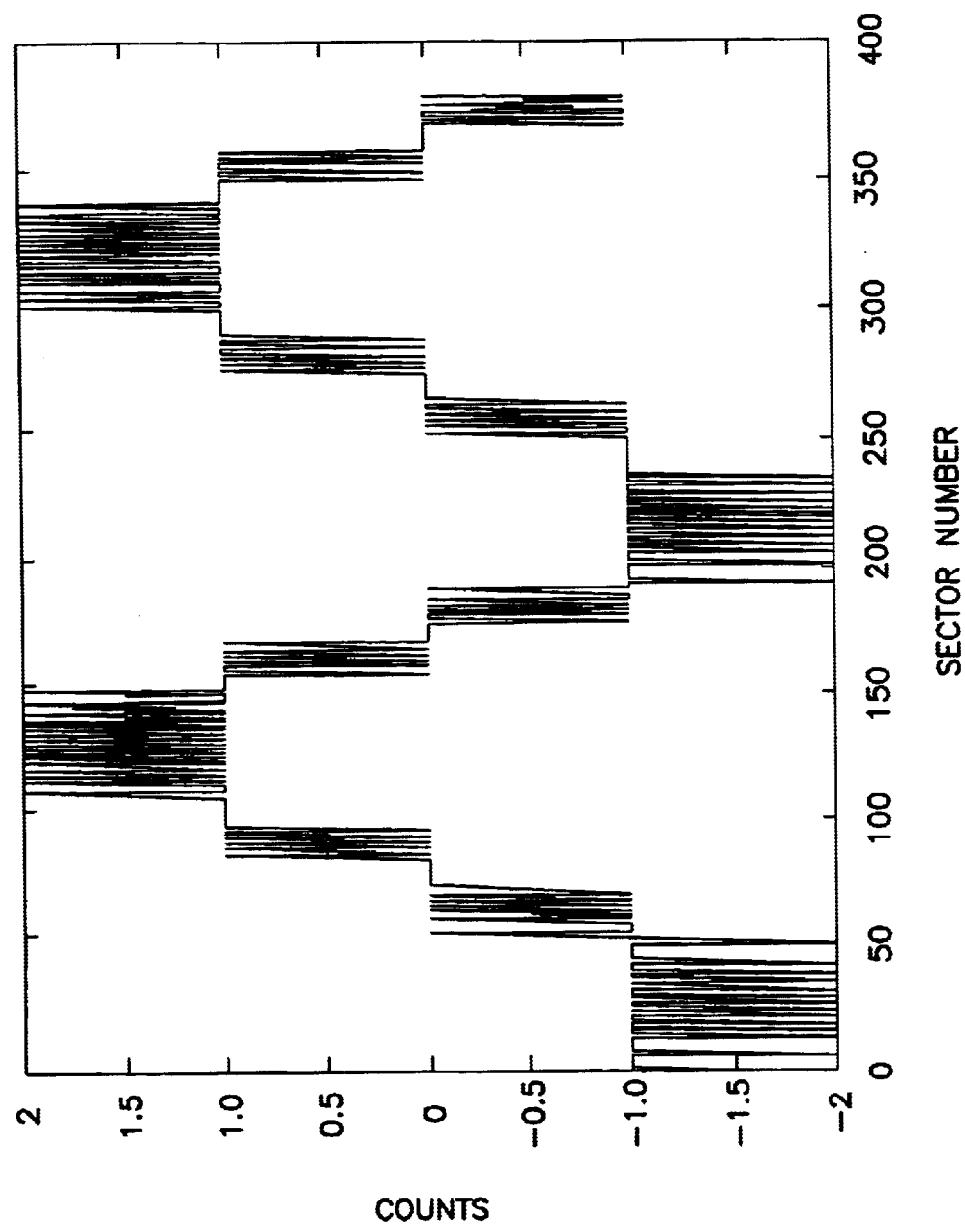
FIG. 8 is a plot showing timing error measured in drive with pre-written discs.
Figure 9:
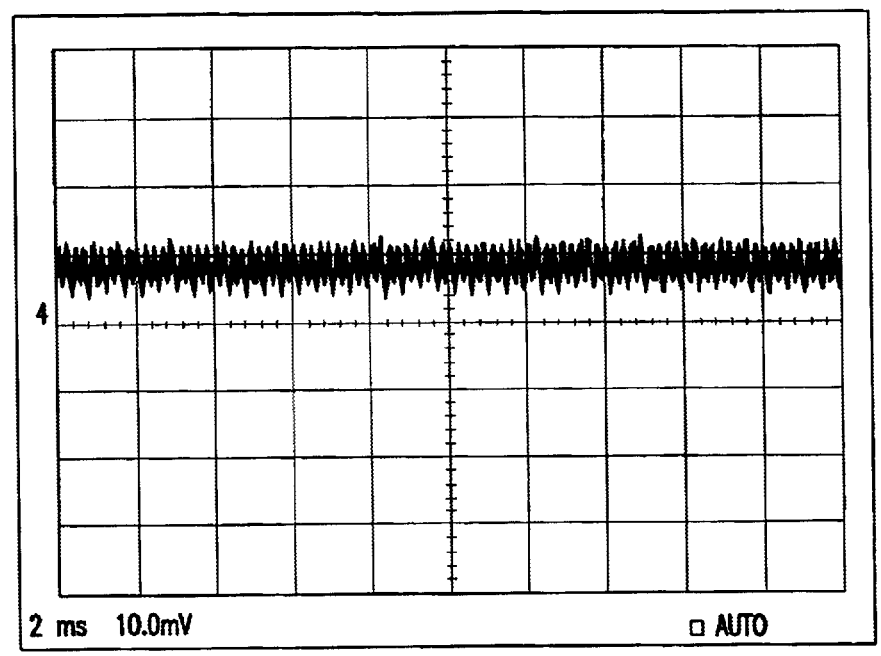
FIG. 9 is a plot showing spindle motor supply current measured in a drive with in-situ written discs.
Figure 10:
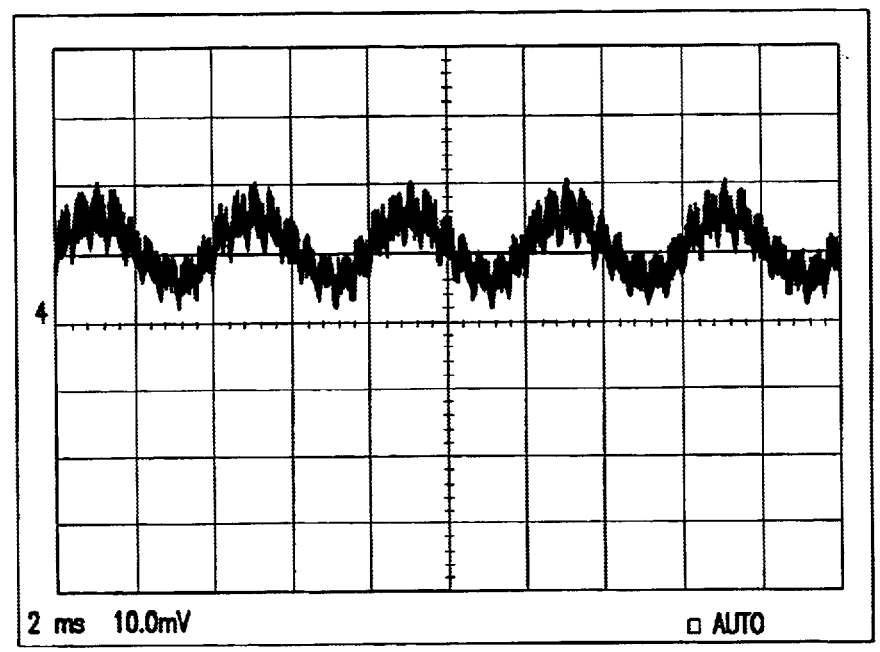
FIG. 10 is a plot showing spindle motor supply current measured in drive with pre-written discs and no compensation for timing variation.

The variation in the sample rate can be quantified in terms of the timing error, e(k), which can be expressed as $$e(k)=T(k)-T_{Sgate} \qquad \text{Equation 1}$$

where k is the sector number, T(k) (see FIG. 5-1) is the interval of time that elapses between the timing marks on sectors k−1 and k, and $T_{Sgate}$ (see FIG. 5-1) is the fixed rate at which the S-gate (the timing mark search window) is generated. For drives with in-situ written discs, the timing error is small and is typically in the range of +/−1 clock count because $T_{Sgate} \cong T(k)$ (see FIG. 5-1). In FIG. 8, the error measured in a drive having track eccentricity is shown. In such a drive with pre-written discs, the timing error is in the range of +/−2 clock counts. As mentioned above, this is undesirable for two reasons. First, to accommodate a larger timing error, the timing mark search window needs to be widened to allow for the increase in the timing error. Second, modulation of the timing error forces variation in the spindle motor current and results in needless energy being dissipated in the drive. FIG. 9 shows the supply current for a drive that has in-situ written discs, and FIG. 10 shows a drive with pre-written discs with no compensation for variation in sample rate being provided. As can be seen in FIG. 10, the current varies significantly in the case of the drive with pre-written discs because the variation in e(k) forces variation in the spindle motor current.

As mentioned above, the general solution to problems caused by the variation of sample rate in drives with pre-written discs is to generate the S-gate (timing window) so that it tracks the variation in the sample rate. One specific algorithm that can be employed in timing mark search window generator 404 to compensate for such timing variation generates the S-gate or timing window at time intervals described by $$T_{Sgate}(k) = A(\text{track\_id})\sin\left(\frac{2\pi}{N}k\right) + B(\text{track\_id})\cos\left(\frac{2\pi}{N}k\right) + T_{Sgate} \qquad \text{Equation 2}$$

where $T_{Sgate}(k)$ (see FIG. 5-3) is the interval in time that elapses between two consecutive S-gates (timing windows), A(track_id) and B(track_id) are radially-dependent timing coefficients, N is the number of sectors, and $T_{Sgate}$ is the nominal sample rate. In this manner the compensated timing error becomes $$e_c(k)=T(k)-T_{Sgate}(k) \qquad \text{Equation 3}$$

Figure 11:
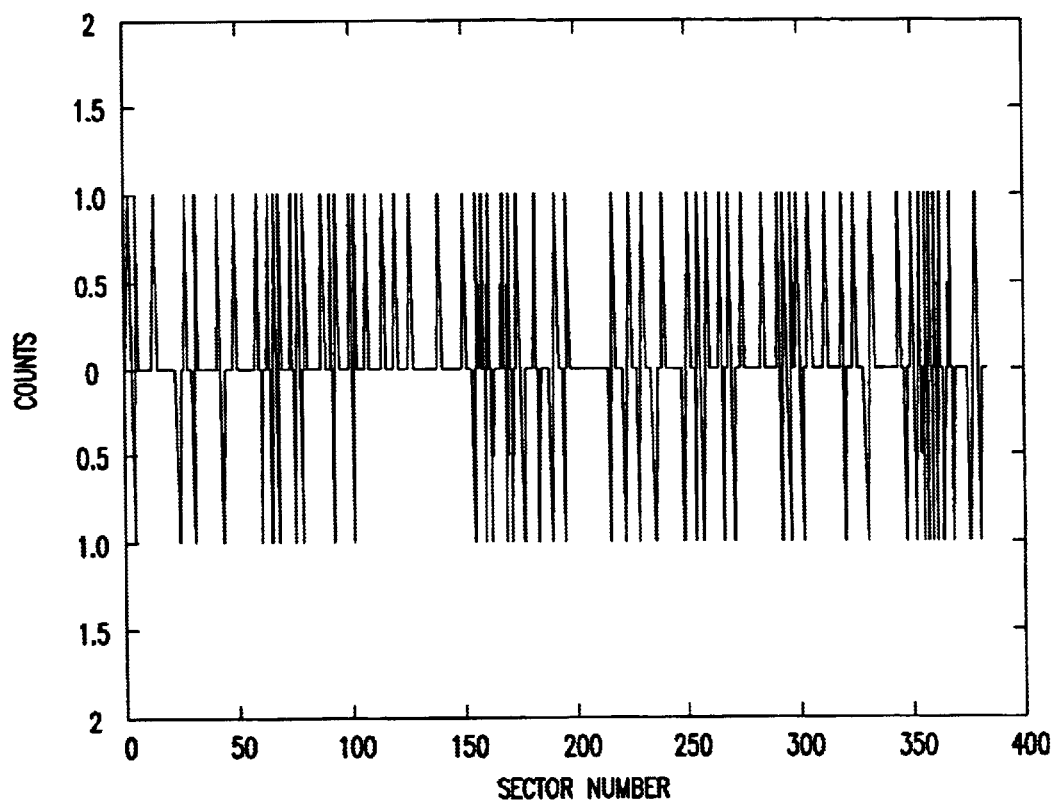
FIG. 11 is a plot showing timing error measured in a drive with pre-written discs and with compensation for timing variation in accordance with the present invention.
Figure 12:
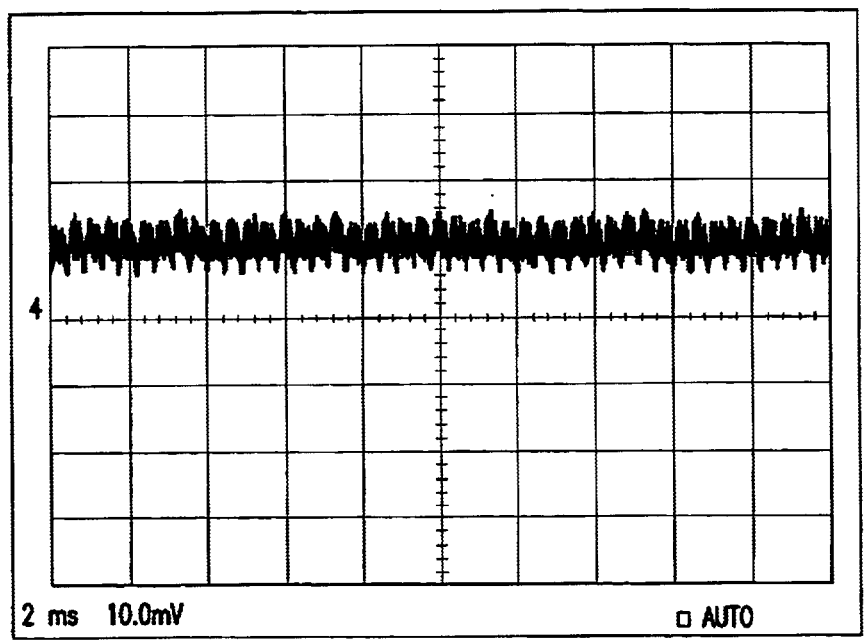
FIG. 12 is a plot showing spindle motor supply current measured in a drive with compensation for timing variation in accordance with the present invention.

If A(track_id) and B(track_id) are calibrated correctly, then $T_{Sgate}(k) \cong T(k)$, and the timing error will be small. The objective of this design was to limit the timing error to be no greater than +/−1 clock count (i.e., the level observed in drives with in-situ written discs). This approach was implemented on a drive having pre-written media and the results are shown in FIGS. 11 and 12. FIG. 12 shows the timing error with timing compensation enabled. As can be seen if FIG. 12, the performance objective for this algorithm was met, since the timing error was reduced to +/−1 clock counts.

This approach also eliminates the complication arising in the spindle-motor control loop since the timing error is no longer modulated. The supply current for a drive with pre-written media is shown in both FIGS. 10 and 12. FIG. 10 represents the current without timing compensation and FIG. 12 shows the current with timing compensation. The significant variation in the supply current has been eliminated for the case with timing compensation enabled.

Figure 13:
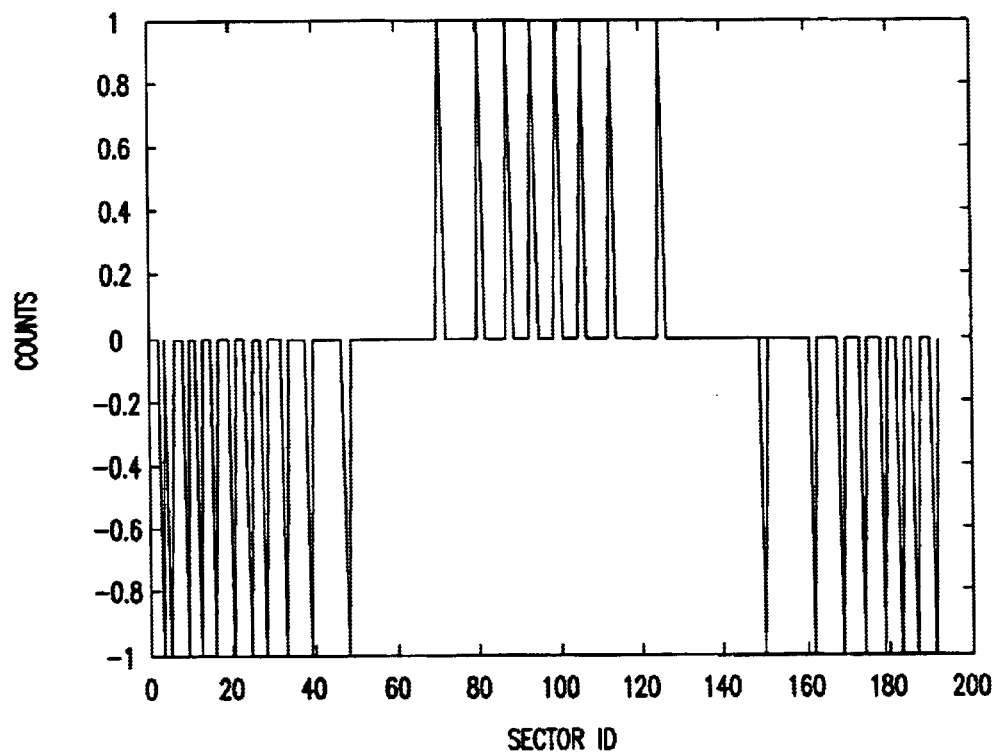
FIG. 13 is a plot showing timing error measured in a drive having a small level of track eccentricity.
Figure 14:
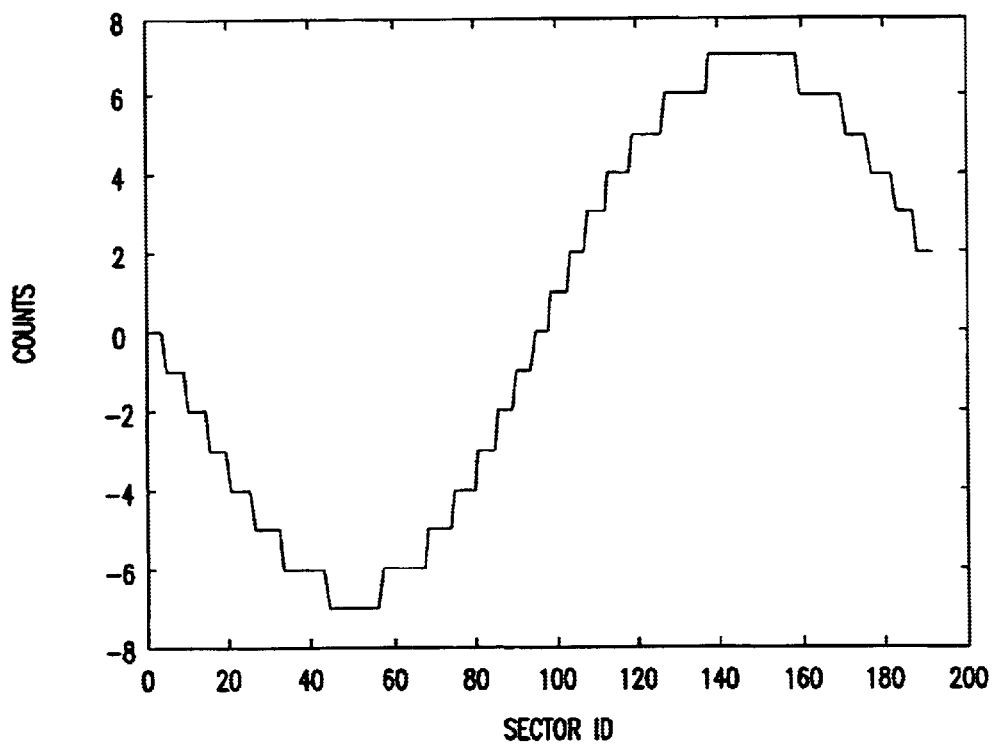
FIG. 14 is a plot showing the integral of timing error measured in a drive having a small level of track eccentricity.

As mentioned above, the timing error that arises due to track eccentricity is essentially sinusoidal. Further, the magnitude and phase are radially dependent. However, the resolution of the timing error can be poor as shown in FIG. 13, thereby making the determination of the magnitude and phase of the timing error challenging. To deal with the resolution problem, the integral of the timing error, which is also sinusoidal, is employed since the magnitude and phase of the integrated signal can be related back to the magnitude and phase of the original signal. As shown in FIG. 14, the resolution of the integrated signal is substantially clearer than the original signal shown in FIG. 13. The integrated signal, $z(k)$, can be generated from timing error, $e(k)$, as $$z(k+1) = z(k) + e(k) \qquad \text{Equation 4}$$

Applying the Discrete Fourier Transform for a single frequency to Equation 4 yields $$z(k+1) = c^* \sin\left(\frac{2\pi}{N}K\right) + d^* \cos\left(\frac{2\pi}{N}K\right) \qquad \text{Equation 5}$$

where $$c = \frac{2}{N*revs} \sum_{k=0}^{N*revs-1} \sin\left(\frac{2\pi}{N}k\right) z(k) \qquad \text{Equation 6}$$

and $$d = \frac{2}{N*revs} \sum_{k=0}^{N*revs-1} \cos\left(\frac{2\pi}{N}k\right) z(k) \qquad \text{Equation 7}$$

where revs is the number of revolutions of data used in the above calculations. Timing error, $e(k)$, is the derivative of Equation 5, therefore $$e(k) = \frac{2\pi}{N} * c * \cos\left(\frac{2\pi}{N}k\right) - \frac{2\pi}{N} d * \sin\left(\frac{2\pi}{N}k\right) \qquad \text{Equation 8}$$

Equation 8 can be re-written as $$e(k) a * \sin\left(\frac{2\pi}{N}k\right) + b * \cos\left(\frac{2\pi}{N}k\right) \qquad \text{Equation 9}$$

where $$a = -\frac{4\pi}{N^2 * revs} \sum_{k=0}^{N*revs-1} \cos\left(\frac{2\pi}{N}k\right) z(k) \qquad \text{Equation 10}$$

and $$b = \frac{4\pi}{N^2 * revs} \sum_{k=0}^{N*revs-1} \sin\left(\frac{2\pi}{N}k\right) z(k) \qquad \text{Equation 11}$$

A(track_id) and B(track_id) can be computed from Equations 10 and 11 which show how the a and b coefficients are generated for a single track. By repeating this calculation over a range of tracks, curves for A(track_id) and B(track_id) can be generated. A least-squares error polynomial fit can then be performed on the curves for A(track_id) and B(track_id) to arrive at polynomial descriptions for A(track_id) and B(track_id).

Figure 15:
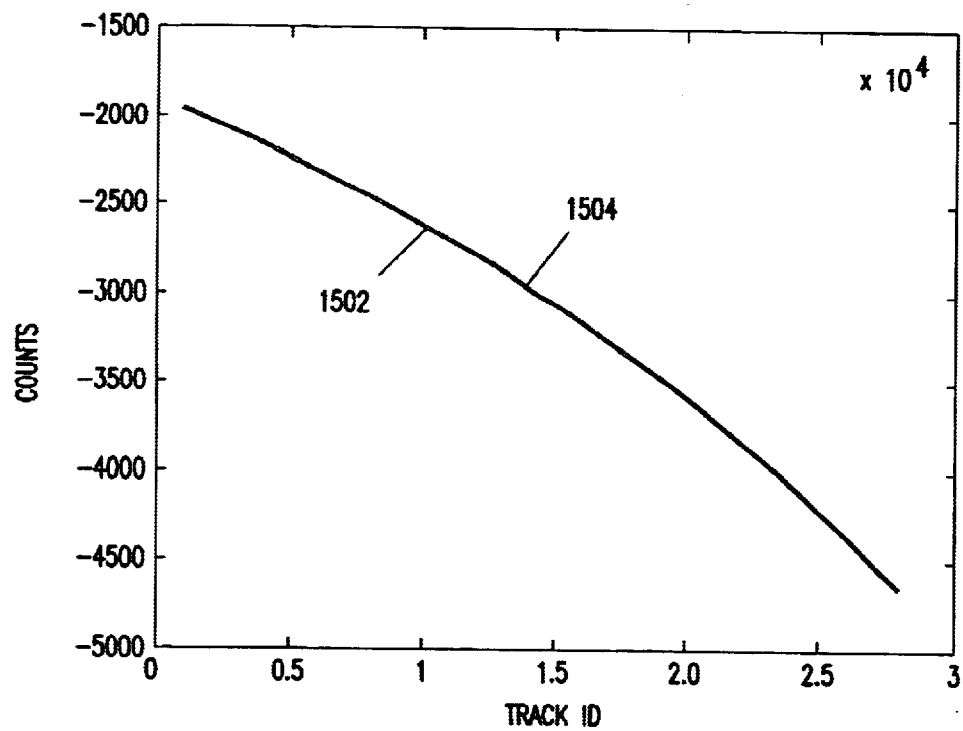
FIGS. 15 and 16 are plots representing radially-depending timing coefficient values for different tracks.
Figure 16:
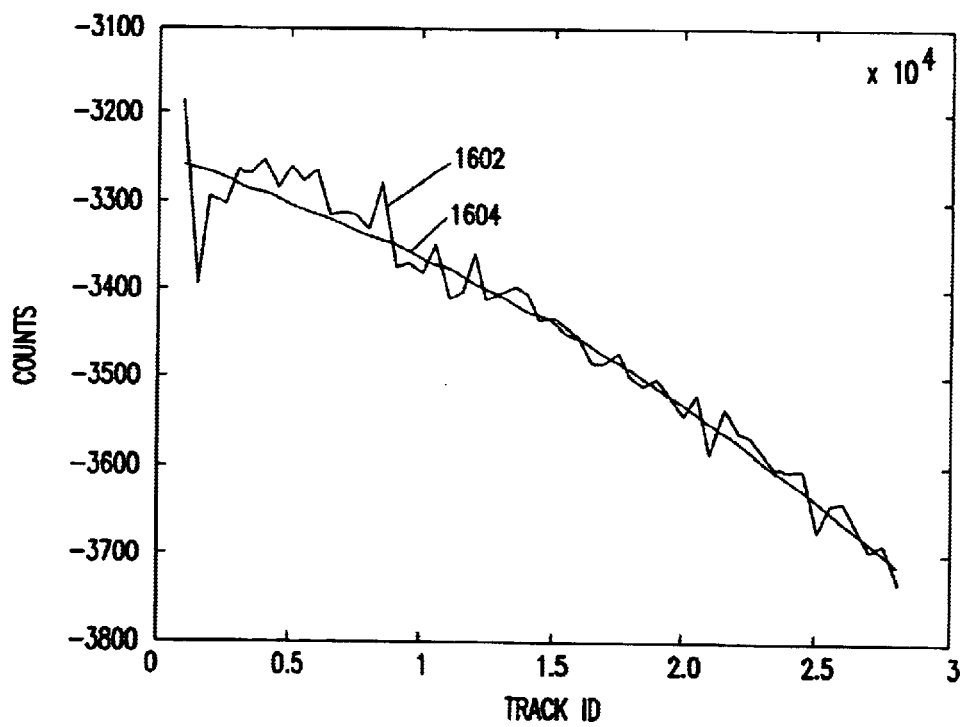

A polynomial fit for A(track_id) and B(track_id) is performed as follows: Equations 4, 10 and 11 are used to generate A(track_id) and B(track_id) at J equally spaced tracks from the disc OD to ID. Curves for A(track_id) and B(track_id) generated in this manner are represented by the reference numerals 1502 and 1602 in FIGS. 15 and 16, respectively. A third degree polynomial is then fit to each of these curves (reference numerals 1504 and 1604 in FIGS. 15 and 16, respectively), and the resulting polynomials are used for A(track_id) and B(track_id).

A least-squares polynomial fit method for determining A(track_id) and B(track_id) is descried below in connection with Equations 12 through 18. The discussion is limited to computing the coefficients for A(track_id), but the method is identical for B(track_id). Let the desired polynomial for A be described as $$A(x) = c_0 + c_1 x + c_2 x^2 + c_3 x^3 \qquad \text{Equation 12}$$

where x, the normalized track ID, is computed as $$x = track\_id/track\_normalization\_constant \qquad \text{Equation 13}$$

During the calibration process, the values for $a(x)$ are read at J predetermined track locations to form J ordered pairs $(x_i, y_i)$ where $$y_i = a@x_i \qquad \text{Equation 14}$$

A least-squares solution for computing the polynomial coefficients can be computed as $$C = XY \qquad \text{Equation 15}$$

where $$C = [c_0 \ c_1 \ c_2 \ c_3]' \qquad \text{Equation 16}$$

$$X = \begin{bmatrix} J & \sum_{i=1}^{J} x_i & \sum_{i=1}^{J} x_i^2 & \sum_{i=1}^{J} x_i^3 \\ \sum_{i=1}^{J} x_i & \sum_{i=1}^{J} x_i^2 & \sum_{i=1}^{J} x_i^3 & \sum_{i=1}^{J} x_i^4 \\ \sum_{i=1}^{J} x_i^2 & \sum_{i=1}^{J} x_i^3 & \sum_{i=1}^{J} x_i^4 & \sum_{i=1}^{J} x_i^5 \\ M & M & M & \\ \sum_{i=1}^{J} x_i^n & \sum_{i=1}^{J} x_i^{n+1} & \sum_{i=1}^{J} x_i^{n+2} & \sum_{i=1}^{J} x_i^6 \end{bmatrix}^{-1} \qquad \text{Equation 17}$$

$$Y = \left[ \sum_{i=1}^{k} y_i \ \sum_{i=1}^{k} x_i y_i \ \sum_{i=1}^{k} x_i^2 y_i \ \sum_{i=1}^{k} x_i^3 y_i \right]' \qquad \text{Equation 18}$$

Since the x's contained within the matrix X in Equation 17 above are fixed predetermined values, the matrix X (Equation 17) can be computed offline and stored in memory. Further, matrix X (Equation 17) is common to all calculations for polynomials A(track_id) and B(track_id). Additionally, the matrix X (Equation 17) would be common for all drives within a drive platform. Thus, the least-squares polynomial fit method is adaptable and involves the storage of a relatively small amount of data. Data for the least-squares polynomial fit method can be obtained during a factory calibration procedure that is carried out during manufacture of the disc drive, a startup calibration procedure that is carried out during initial startup of the disc drive or a refined calibration procedure that is carried out subsequent to the initial startup of the disc drive.

Figure 17:
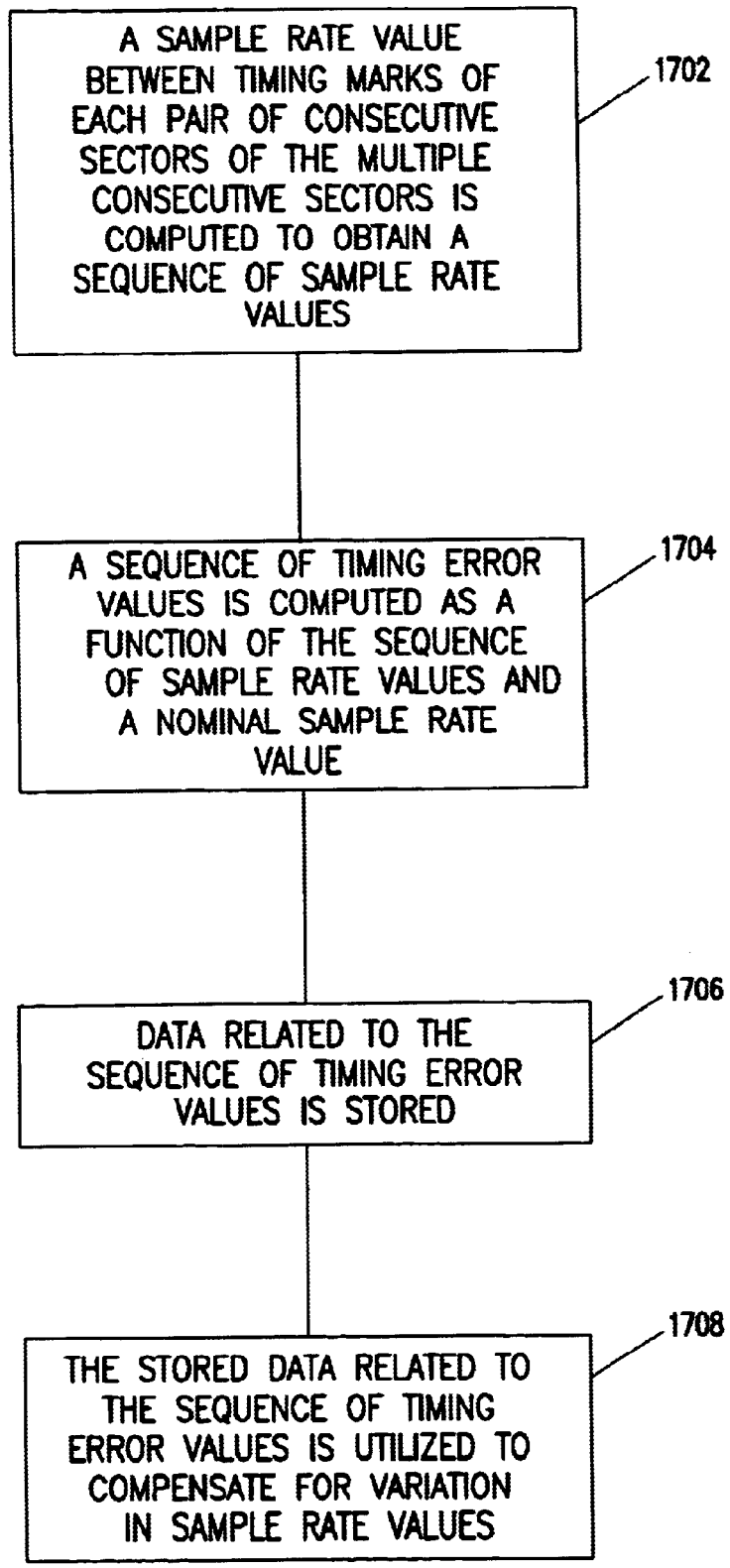
FIG. 17 is a flow chart representing a method of compensating for variation in sample rate in accordance with an illustrative embodiment of the present invention.

FIG. 17 is a flow chart representing a method of compensating for variation in sample rate in a disc drive having a rotating disc and a head that is positioned over the rotating disc in accordance with an illustrative embodiment of the present invention. The disc includes at least one track that has multiple consecutive sectors. At step 1702, a sample rate value between timing marks of each pair of consecutive sectors of the multiple consecutive sectors is computed to obtain a sequence of sample rate values. At step 1704, a sequence of timing error values is computed as a function of the sequence of sample rate values and a nominal sample rate value. At step 1706, data related to the sequence of timing error values is stored. At step 1708, the stored data related to the sequence of timing error values is utilized to compensate for variation in sample rate values. Different techniques, some of which are set forth above, can be employed to carry out the steps shown in the flow chart of FIG. 17 while maintaining substantially the same functionality without department from the scope and spirit of the present invention.

In summary, a method for compensating for variation in sample rate in a disc drive (such as 100) having a rotating disc (such as 200) and a head (such as 110) that is positioned over the rotating disc (such as 200) is provided. The disc (such as 200) includes at least one track (such as 202) that has multiple consecutive sectors (such as 220–227). A sample rate value between timing marks (such as 230–237) of each pair of consecutive sectors (such as 230 and 231 and 231 and 232) of the multiple consecutive sectors (such as 230–237) is computed to obtain a sequence of sample rate values. A sequence of timing error values is computed as a function of the sequence of sample rate values and a nominal sample rate value. Data related to the sequence of timing error values is utilized to compensate for variation in sample rate values.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive while maintaining substantially the same functionality without departing from the scope and spirit of the present invention. In addition, although the preferred embodiment described herein is directed to a compensation scheme for timing variation in disc drives employing a servo tracking system, it will be appreciated by those skilled in the art that the teachings of the present invention can be applied to other systems, without departing from the scope and spirit of the present invention. Further, the compensation scheme for timing variation may be implemented in hardware or software. The disc drive can be based upon magnetic, optical, or other storage technologies and may or may not employ a flying slider. Also, the teachings of the present invention are applicable whenever angle θ between different adjacent sectors is not the same. For example, when misalignment between the spin axis and the track center occurs in an in-situ drive due to shock, the compensation scheme of the present invention can be utilized for correcting the resulting timing variation.

What is claimed is:

1. A method of compensating for variation in sample rate in a disc drive having a rotatable disc and a head that is positionable over the rotatable disc, the disc including at least one track having a plurality of consecutive sectors, the method comprising:
   (a) computing a sample rate value between timing marks of pairs of consecutive sectors of the plurality of consecutive sectors to obtain a sequence of sample rate values;
   (b) computing a sequence of timing error values as a function of the sequence of sample rate values and a nominal sample rate value; and
   (c) utilizing radially-dependent timing coefficients, related to the sequence of timing error values, to compensate for variation in sample rate values.

2. The method of claim 1 wherein the utilizing data step (c) further comprises generating timing mark search windows as a function of the radially-dependent timing coefficients, related to the sequence of timing error values, to thereby detect timing marks of the plurality of sectors of the at least one track of the disc drive.

3. The method of claim 1 wherein the utilizing radially-dependent timing coefficients step (c) further comprises controlling a supply current of a spindle motor that rotates the disc as a function of the sequence of timing error values.

4. The method of claim 1 further comprising storing the radially-dependent timing coefficients related to the sequence of timing error values in a memory.

5. The method of claim 4 wherein the radially-dependent timing coefficients related to the sequence of timing error values are determined from a calibration procedure.

6. The method of claim 5 wherein the calibration procedure is a factory calibration procedure that is carried out during manufacture of the disc drive.

7. The method of claim 5 wherein the calibration procedure is a startup calibration procedure that is carried out during initial startup of the disc drive.

8. The method of claim 5 wherein the calibration procedure is a refined calibration procedure that is carried out subsequent to the initial startup of the disc drive.

9. The method of claim 1 wherein the at least one track is one of a plurality of tracks, and wherein steps (a), (b) and (c) are carried out for a subset of the plurality of tracks.

10. The method of claim 9 wherein each track of the subset of the plurality of tracks are spaced evenly apart between an inner diameter and an outer diameter of the disc.

11. The method of claim 10 wherein each track of the subset of the plurality of tracks is in a different zone of a plurality of zones, each zone containing multiple tracks.

12. A disc drive comprising:
    a rotatable disc having at least one track that comprises a plurality of consecutive sectors;
    a head that is positionable over the rotatable disc by a servo control system; and a timing control system, electrically couplable to the head, adapted to compensate for variation in sample rate in the disc drive by:
  computing a sample rate value between timing marks of pairs of consecutive sectors of the plurality of consecutive sectors to obtain a sequence of sample rate values;
  computing a sequence of timing error values as a function of the sequence of sample rate values and a nominal sample rate value; and
  utilizing radially-dependent timing coefficients, related to the sequence of timing error values, to compensate for variation in sample rate values.

13. The disc drive of claim 12 wherein the timing control system is further adapted to utilize the radially-dependent timing coefficients, related to the sequence of timing errors values, by generating timing mark search windows as a function of the radially-dependent timing coefficients, related to the sequence of timing error values, to thereby detect timing marks of the plurality of sectors of the at least one track of the disc drive.

14. The disc drive of claim 12 wherein the timing control system is further adapted to store the radially-dependent timing coefficients related to the sequence of timing error values in a non-volatile memory.

15. The disc drive of claim 14 wherein the timing control system is further adapted to determine the radially-dependent timing coefficients from a calibration procedure.

16. The disc drive of claim 12 wherein the timing control system comprises a timing mark search window generation circuit and a timing mark detection circuit.

17. A disc drive comprising:
  a head that is positionable over a rotatable disc by a servo control system, the rotatable disc having at least one track that comprises a plurality of consecutive sectors; and
  a timing control means, electrically coupled to the head, for compensating for variation in sample rate values in the at least one track of the disc drive.

18. The disc drive of claim 17 wherein the timing control means comprises a timing control system adapted to compensate for variation in sample rate in the at least one track of the disc drive by:
  computing a sample rate value between timing marks of each pair of consecutive sectors of the plurality of consecutive sectors to obtain a sequence of sample rate values;
  computing a sequence of timing error values as a function of the sequence of sample rate values and a nominal sample rate value; and
  utilizing data related to the sequence of timing error values to compensate for variation in sample rate values in the at least one track of the disc drive.

19. The disc drive of claim 18 wherein the timing control system is further adapted to utilize the data related to the sequence of timing errors values by generating timing mark search windows as a function of the data related to the sequence of timing error values to thereby detect timing marks of the plurality of sectors of the at least one track of the disc drive.

* * * * *